United States Patent [19]  [11] Patent Number: 4,581,956
Robert  [45] Date of Patent: Apr. 15, 1986

[54] SCREWING-UNSCREWING APPARATUS, MORE ESPECIALLY FOR SCREWING THE STUD-BOLTS FIXING THE LID OF THE REACTOR VESSEL OF A NUCLEAR REACTOR

[75] Inventor: Brieuc Robert, Nanterre, France

[73] Assignee: Kley-France, France

[21] Appl. No.: 568,636

[22] Filed: Jan. 6, 1984

[30] Foreign Application Priority Data

Jan. 28, 1983 [FR] France ............................... 83 01315

[51] Int. Cl.⁴ ....................... B25B 29/02; B25B 13/00
[52] U.S. Cl. .................................... 81/57.38; 81/57.36
[58] Field of Search ................ 81/57.14, 57.22, 57.24, 81/57.3, 57.36, 57.38, 57.4; 254/29 A

[56] References Cited

U.S. PATENT DOCUMENTS 4,047,456  9/1977  Scholz ................................. 81/57.38
4,120,218  10/1978 Togel et al. ......................... 81/57.38
4,314,690  2/1982  Mlynarik et al. ................. 254/29 A
4,380,181  4/1983  Bunyan ............................... 81/57.38

Primary Examiner—James G. Smith

[57] ABSTRACT

A screwing-unscrewing apparatus is provided, more especially for screwing-unscrewing the stud-bolts securing the lid of the reactor vessel of a nuclear reactor, comprising a frame, at least one traction assembly, at least one screwing-unscrewing assembly and at least one support assembly for a stud-bolt. The piston rod of the traction cylinder and the traction head of the traction assembly are hollow. The screwing-unscrewing assembly comprises a hollow rod which passes through the piston rod and through the traction head, is provided at its lower end with a male drive member and is connected kinematically at its upper end to a rotational drive mechanism, which is situated above said traction cylinder. Said support assembly comprises another rod, which is mounted for rotation, while being prevented from axial movement, inside said hollow rod and which is threaded at its lower end, and another rotational drive mechanism which is connected kinematically to the upper end of said other rod.

15 Claims, 9 Drawing Figures

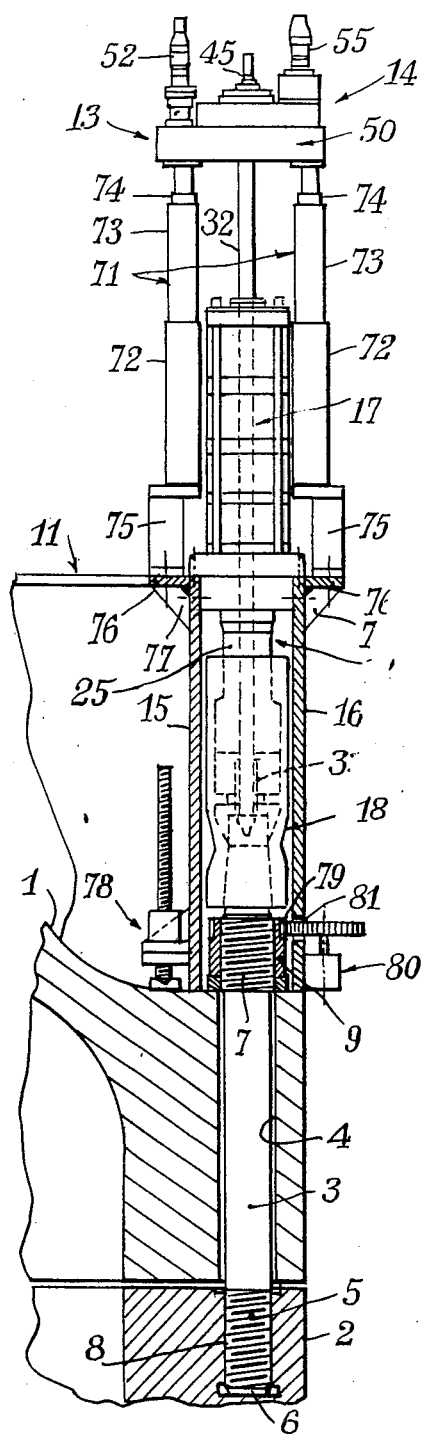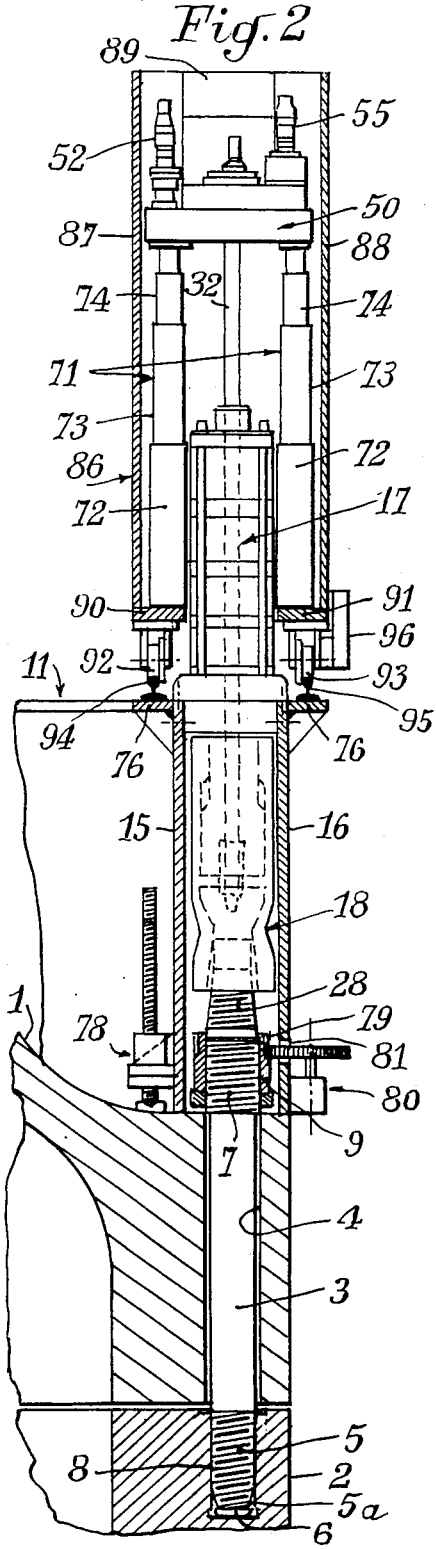

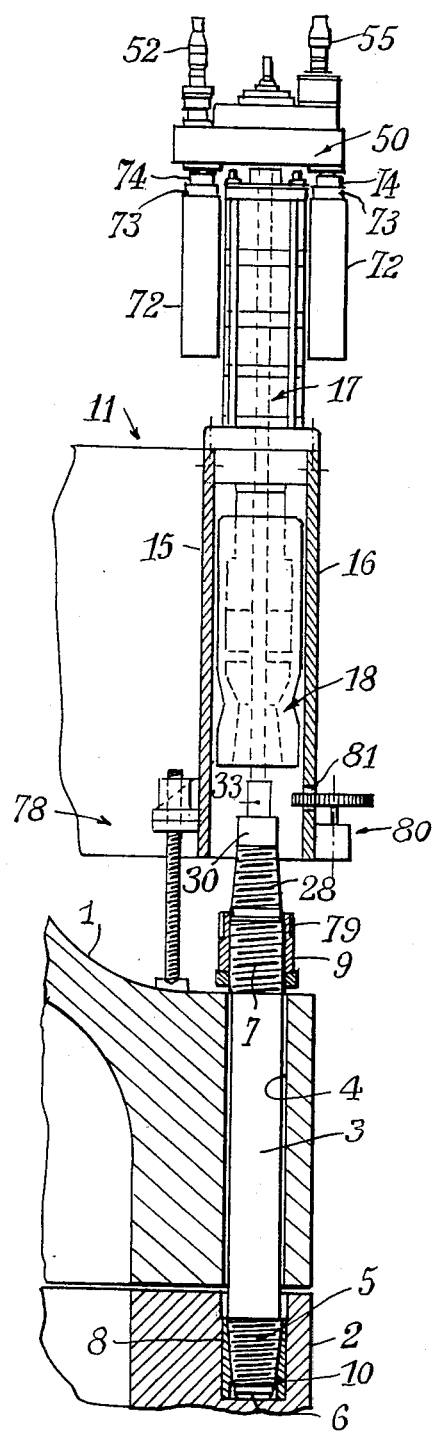
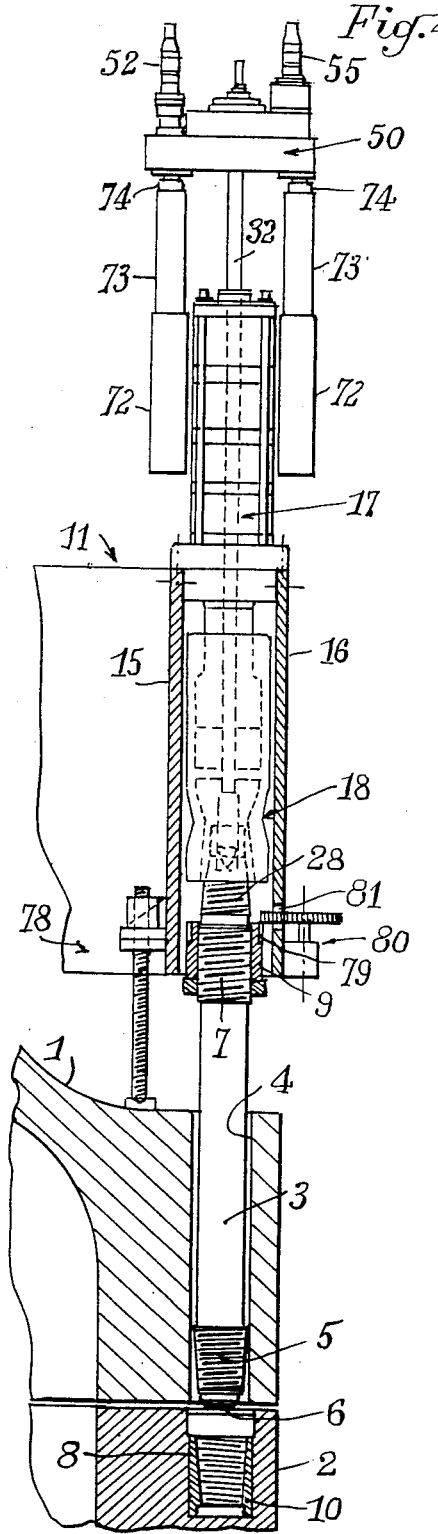

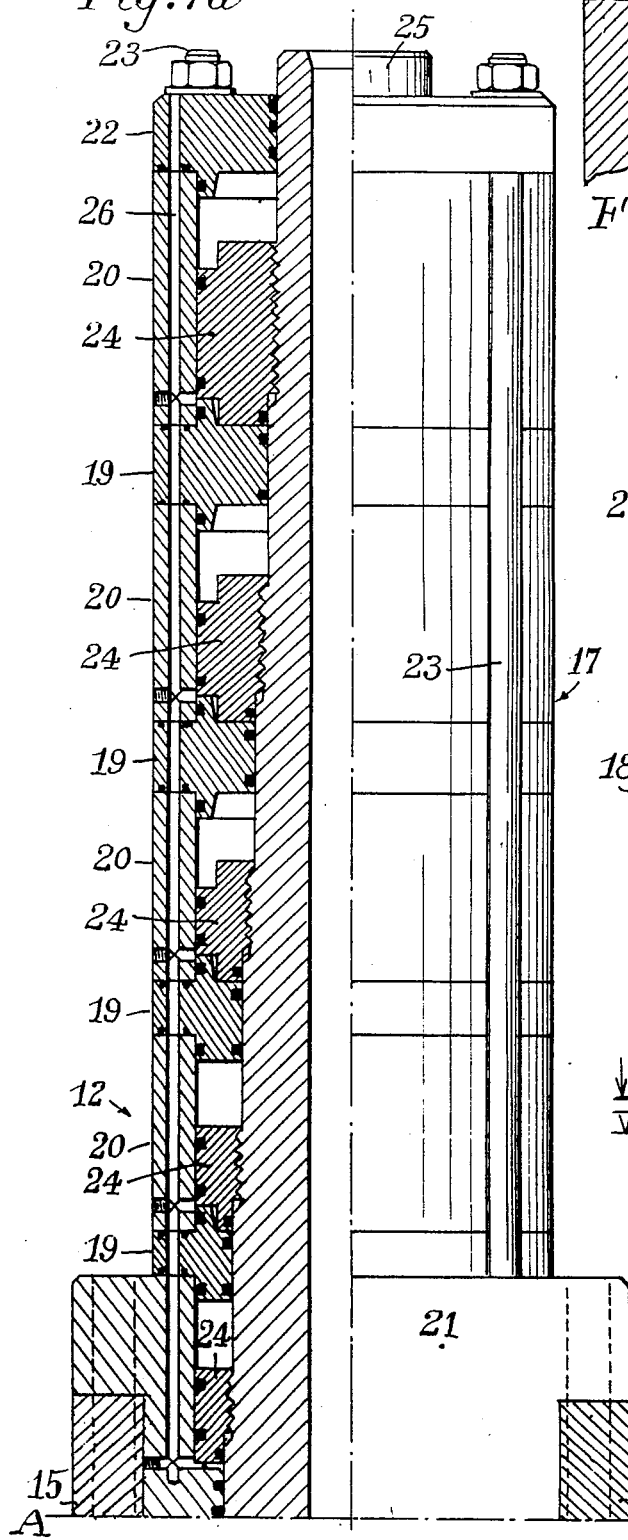
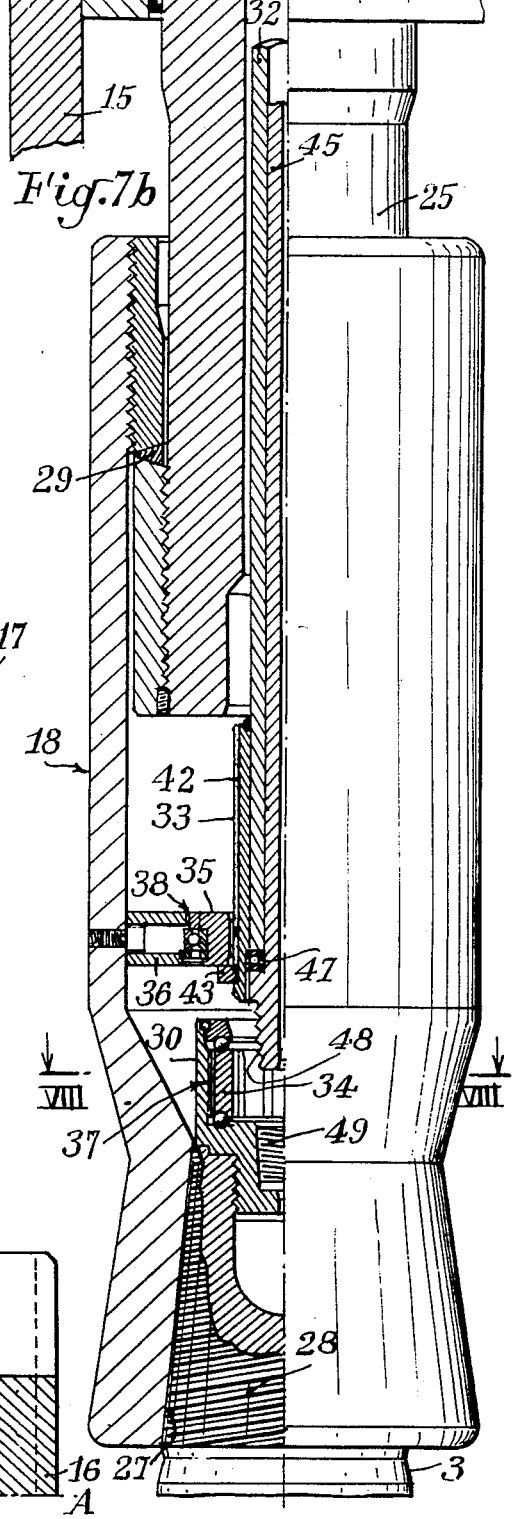

SCREWING-UNSCREWING APPARATUS, MORE ESPECIALLY FOR SCREWING THE STUD-BOLTS FIXING THE LID OF THE REACTOR VESSEL OF A NUCLEAR REACTOR

BACKGROUND OF THE INVENTION

1. Field of the Invention

The present invention relates to a screwing - unscrewing apparatus, in particular for screwing-unscrewing the studbolts securing the cover of the reactor vessel of a nuclear reactor, of the type comprising a frame, at least one traction assembly, at least one screwing-unscrewing assembly and at least one support assembly for a stud-bolt, which are mounted on the frame, said traction assembly comprising a traction cylinder having a body fixed vertically to the frame and a traction head which is connected to the piston rod of the traction cylinder and which is operative to grip an upper part of a securing bolt for exerting a vertical pull thereon, said screwing-unscrewing assembly comprising a rotational drive mechanism operative to come into drive relation with the upper part of the stud-bolt, and said support assembly being operative to grip the upper part of the stud-bolt for supporting it.

2. Description of the Prior Art

In nuclear reactors, the cover or lid is removably fixed to the reactor vessel so as to allow, from time to time or periodically, inspection of the inside of the vessel and/or of the members situated inside the vessel and for allowing repair thereof if required. This securing is achieved by a large number of stud-bolts, in general 58 stud bolts in a reactor of the P.W.R type. Usually, each studbolt extends vertically and comprises, in its lower part, a cylindrical threaded portion extended by a smooth truncated cone shaped portion for facilitating engagement of the stud-bolt in a tapped hole in the upper edge of the vessel, and, in its upper part, another cylindrical threaded portion on which is screwed a locking nut.

During securing of the lid, each stud-bolt is caused to pass through a smooth hole in the lid, then each studbolt is engaged and screwed in one of the tapped holes in the vessel. Then, a strong pull is exerted on each stud-bolt, then the nut associated with the bolt is turned by a few turns so as to be placed in contact with the lid without clamping. Then, the pull exerted on each stud-bolt is released. For removing the lid, the reverse operations are carried out.

The screwing-unscrewing apparatuses at present in use, which allow the above mentioned operations to be carried out are either automatic or semi-automatic. In the automatic version, a traction assembly, a screwing-unscrewing assembly and a support assembly are associated with each stud-bolt. In the semi-automatic version, a traction assembly is associated with each stud-bolt, and a limited number of screwing-unscrewing assemblies and a corresponding limited number of support assemblies, for example one or two assemblies of each, are provided which are brought selectively and successively into functional relation with the stud-bolts.

In the two automatic and semi-automatic versions, the operations for screwing or unscrewing the studbolts are uncertain. In fact, because of the manufacturing tolerances of the lid, of the tapped holes in the vessel and of the screwing-unscrewing apparatus itself, the axes of the active elements of the screwing-unscrewing apparatus never tally perfectly with the axes of the tapped holes in the vessel or with the axes of the studbolts. The result is that, despite the presence of a smooth truncated cone shaped part at the lower end of each stud-bolt, it often happens that centering of the stud-bolt can not be effected automatically during fitting of the stud-bolt into the tapped hole of the vessel, and that this operation must be carried out manually as well as the first screwing up turns of the stud-bolt. Similarly, during an operation for unscrewing the stud-bolt, it happens that the active elements of the screwing-unscrewing apparatus cannot correctly grip the upper part of the stud-bolt and must therefore be positioned manually with respect thereto. Furthermore, since the axes of the traction cylinders and of the other active elements of the screwing-unscrewing apparatus do not tally perfectly with the axes of the tapped holes in the vessel, these alignment defects result in the parts driven with a relative movement being subjected to stresses which are unevenly distributed about their translational or rotational axis, thus causing, by friction, uneven and premature wear of these parts.

Another problem resides in the fact that each studbolt must be subjected to a strong pull at a given moment during the screwing or unscrewing operation. In the apparatus at present in use, this strong pull is obtained by means of a traction cylinder having a single piston of relatively large diameter. Because of the relatively large number of studbolts and because of their relatively small mutual spacing, the use of large diameter traction cylinders makes it necessary to dispose the traction cylinders in positions alternatively offset in height. Furthermore, since the diameter of the traction cylinders is necessarily limited by the small mutual spacing between the stud-bolts, the traction cylinders must be supplied with fluid under a very high pressure, in general $1,5.10^8$ Pa or more, so as to obtain the required pulling force. This increases the cost and the complexity of the hydraulic feed systems in so far as construction, sealing and safety are concerned.

A first object of the present invention is to solve the alignment problems by a relative judicious arrangement of the traction assembly, the screwing-unscrewing assembly and the support assembly of the screwing-unscrewing apparatus.

A second object of the invention is to allow automatic alignment of the different active elements of the screwing-unscrewing apparatus with respect to the axis of the stud-bolt or of the tapped hole in the vessel so as to reduce, even completely eliminate the causes of wear of the parts moving relatively to each other and so as to eliminate any manual positioning or centering operation.

A third object of the present invention is to provide a screwing-unscrewing apparatus in which the traction cylinders have a diameter such that they may be disposed circumferentially side by side, at the same height, and so that they may operate at a substantially lower pressure than in previously known apparatuses, while still being capable of supplying a pulling force as high as in the previously known apparatuses.

SUMMARY OF THE INVENTION

According to the present invention, this first object is achieved by the fact that the piston rod of the traction cylinder and the traction head are hollow, by the fact that the screwing-unscrewing assembly comprises a hollow rod which passes through the hollow rod of the traction cylinder and through the hollow traction head, is provided at its lower end with a male drive member non circular in cross-section and is connected kinematically, at its upper end, to the rotational drive mechanism, which is situated above the traction cylinder, and by the fact that said support assembly comprises another rod which is mounted for rotation, while being prevented from axial movement, inside the hollow rod of the screwing-unscrewing assembly and which is threaded at its lower end, and another rotational drive mechanism which is adjacent to the rotational drive mechanism of the screwing-unscrewing assembly and which is connected kinematically to the upper end of said other rod.

The concentric arrangement of the rod of the support assembly, of the hollow rod of the screwing-unscrewing assembly and of the hollow piston rod and of the hollow traction rod of the traction assembly improves yet the alignment of the different active elements of the screwing-unscrewing apparatus in accordance with the first object of the invention. The alignment of the different elements of the screwing-unscrewing apparatus with respect to the axis of the stud-bolt and to the axis of the tapped hole in the vessel may be further improved by the following arrangements. The hollow rod of the screwing-unscrewing assembly has an outer diameter smaller than the inner diameter of the hollow piston rod of the traction cylinder so as to provide a substantial radial clearance therebetween, and each of the two rotational drive mechanisms is connected kinematically to the corresponding rod by means of a drive coupling having two degrees of freedom respectively in two directions perpendicular to each other and to the axis of the rod. The rod of the support assembly is supported axially by a spherical axial thrust bearing and by an axial air cushion thrust bearing. Furthermore, the traction head is connected to the piston rod of the traction cylinder by means of a coupling allowing both inclination of the axis of the traction head with respect to that of the piston rod and mutual shifting of these two axes in the transverse direction. Aligning of the different active elements of the screwing-unscrewing apparatus with respect to the axis of the stud-bolt and of this latter with respect to the axis of the tapped hole in the vessel may be further improved, as will be seen in greater detail further on, by using threaded portions which are tapering over at least a part of their length.

The third object of the present invention may be achieved by using, as traction cylinder, a stepped cylinder, comprising several pistons fixed at regular intervals to the hollow piston rod and whose chambers are fed in parallel with a fluid under pressure.

BRIEF DESCRIPTION OF THE DRAWINGS

Other characteristics and advantages of the present invention will become clearer during the following description of one embodiment of the present invention, given by way of example with reference to the accompanying drawings in which:

FIGS. 1 to 4 show, partially in section and partially in elevation, a part of the screwing-unscrewing apparatus according to the present invention in different work positions, FIG. 1 further showing the apparatus in its automatic version and FIG. 2 in its semi-automatic version; in addition, FIGS. 1,2 and 3 show respectively three possible shapes for the threaded portion of the lower part of the stud bolt.

FIGS. 7a and 7b, joined together along line A—A, show an enlarged view partially in vertical section and partially in elevation of the lower part of the screwing-unscrewing apparatus of FIG. 1.

DESCRIPTION OF THE PREFERRED EMBODIMENT

Figure 5:
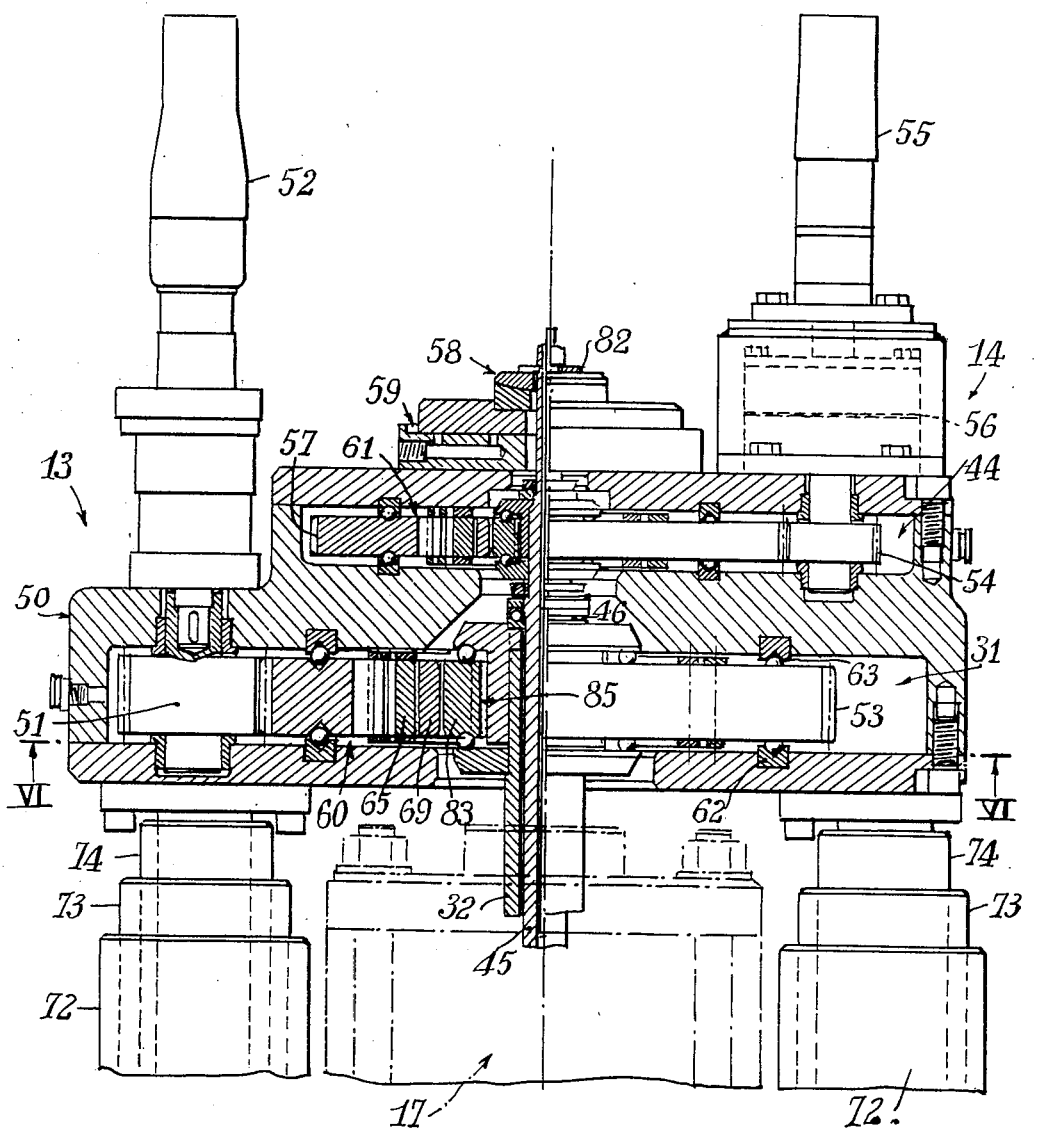
FIG. 5 shows an enlarged view partially in vertical section and partially in elevation of the upper part of the screwing-unscrewing apparatus shown in FIGS. 1 to 4.

In FIGS. 1 to 4, for reasons of simplification, only the peripheral edge of lid 1 and the peripheral edge of the reactor vessel 2 of a nuclear reactor have been shown. In fact, as is well known, the lid 1 and reactor vessel 2 have a form of revolution about a vertical geometrical axis (not shown) which, if it had been shown, would be situated on the left hand side of FIGS. 1 to 4. Lid 1 may be removably fixed to vessel 2 by several stud-bolts 3 with vertical axis, for example 58 stud-bolts in the case of a P.W.R. reactor (a single stud-bolt has been shown in FIGS. 1 to 4), which are spaced evenly apart at the periphery of the lid 1 and of vessel 2. Each stud-bolt 3 passes through a smooth hole 4 pierced vertically in the peripheral edge of lid 1 and comprises, in its lower part, a first threaded portion 5 extended by a smooth truncated cone shaped centering portion 6 and, in its lower part, a second threaded portion 7 on which is screwed a nut 9. The threaded portion 5 may be screwed into a tapped hole 8 in the peripheral edge of vessel 2. As shown in FIG. 1, threaded portion 5 may be cylindrical over the whole of its length as in the case of the stud-bolts usually used in this field of the technique. However, according to one feature of the present invention, the threaded portion 5 may be tapered over at least a part of its length, so as to allow automatic centering of the stud-bolt 3 with repect to the tapped hole 8 and so as to allow the thread of threaded portion 5 to engage in that of the tapped hole 8 when stud-bolt 3 is engaged and screwed in hole 8. By tapered threaded portion is not meant here a threaded portion whose helical thread has a radial height or dimension, with respect to the bottom of the helical groove of the thread, decreasing towards the lower end of the stud-bolt 3, but a threaded portion having a helical groove whose bottom is situated on a tapering surface and having a helical thread whose radial height or dimension, with respect to the bottom of the helical groove, is constant over the whole length of the threaded portion. As shown in FIG. 2, threaded portion 5 may taper only in its lower part 5a and be cylindrical in the remaining part thereof. As a variant, threaded portion 5 may taper over the whole of its length as shown in FIGS. 3 and 4. In this latter case, since the threaded portion of the tapped hole 8 is cylindrical, an insert 10 is provided comprising an external cylindrical threaded portion which is screwed into the tapped hole 8 and an internal tapering threaded portion corresponding to the tapering threaded portion 5 of stud-bolt 3. This latter solution not only greatly facilitates centering of stud-bolt 3 and screwing thereof into the insert 10, but it also considerably facilitates repair operations. In fact, if, for any reason the inner threaded portion of the insert 10 is damaged, it is sufficient to replace 10, whereas in the case of FIGS. 1 and 2, it would be necessary to carry out a repair on the vessel 2 itself, which would be more complicated.

The screwing-unscrewing apparatus shown in FIG. 1 comprises essentially a frame 11 and several traction assemblies 12 equal in number to the number of stud-bolts 3, each traction assembly 12 being associated with one of the stud-bolts 3 (for reasons of simplification, a single traction assembly 12 is shown in FIGS. 1 to 4).

In the automatic version of the screwing-unscrewing apparatus, a screwing-unscrewing assembly 13 and a support assembly 14 are permanently associated with each traction assembly 12 as shown in FIG. 1. On the other hand, in the semi-automatic version of the screwing-unscrewing apparatus, one or more screwing-unscrewing assemblies 13 and one or more support assemblies 14, for example two assemblies 13 and two assemblies 14 situated in diametrically opposite positions with respect to the geometrical axis of lid 1 and of vessel 2, may be associated selectively and successively with the traction assemblies 12 in a way which will be described further on in more detail.

Frame 11 comprises a main frame formed of two cylindrical and concentric ferrules 15 and 16 which, in use, are placed coaxially to the axis of lid 1 and vessel 2. The inner ferrule 15 is provided with rings or hooks (not shown) for connecting the screwing-unscrewing apparatus to a hoist or other handling apparatus for placing the screwing-unscrewing apparatus above lid 1.

The traction assemblies 12 are spaced evenly apart circumferentially between the two ferrules 15 and 16, each traction assembly being fixed to these two ferrules. As shown in FIGS. 7a and 7b, each traction assembly 12 comprises essentially a hydraulic traction cylinder 17 and a traction head 18. The body of cylinder 17 is formed by a stack of alternating rings 19 and tubular elements 20, which are clamped between two endmost flanges 21 and 22 by tie-rods 23. The lower endmost flange 21 is fixed to the two cylindrical ferrules 15 and 16. Several pistons 24, for example five pistons, are fixed at regular intervals to the piston rod 25 of cylinder 17, which is hollow and slideably mounted in the endmost flanges 21 and 22 and in rings 19. The annular chambers situated below pistons 24 may be supplied in parallel with pressurised fluid through a passage 26, whereas the annular chambers situated above pistons 24 may be supplied in parallel with pressurised fluid through another passage (not shown) similar to passage 26. With such a construction, the traction cylinder 17 may require little space in the radial direction and provide a very high pulling force, while being supplied with fluid under a pressure of the order of 800 bars, that is to say a substantially lower pressure for equal pulling forces, than the large cylinders with a single piston used in the previously known apparatus.

As shown in FIG. 7b, the traction head 18 is hollow and has substantially a cylindrical shape. At its lower end, the traction head 18 comprises an inner threaded portion 27, preferably tapering, which may be screwed to an external threaded portion 28 of corresponding shape provided at the upper part of the stud-bolt 3 above the threaded portion 7. At its upper part, the traction head 18 is connected to the piston rod 25 of cylinder 17 by means of a biconvex annular joint 29 having two opposite surfaces in the form of spherical zones. With such a joint, the traction head 18 may effect both a limited rocking movement and a transverse movement with respect to the piston rod 25 of cylinder 17, so that this latter may work under good conditions even if the axis of the piston rod 25 is not perfectly aligned with the axis of the stud-bolt 3.

Figure 6:
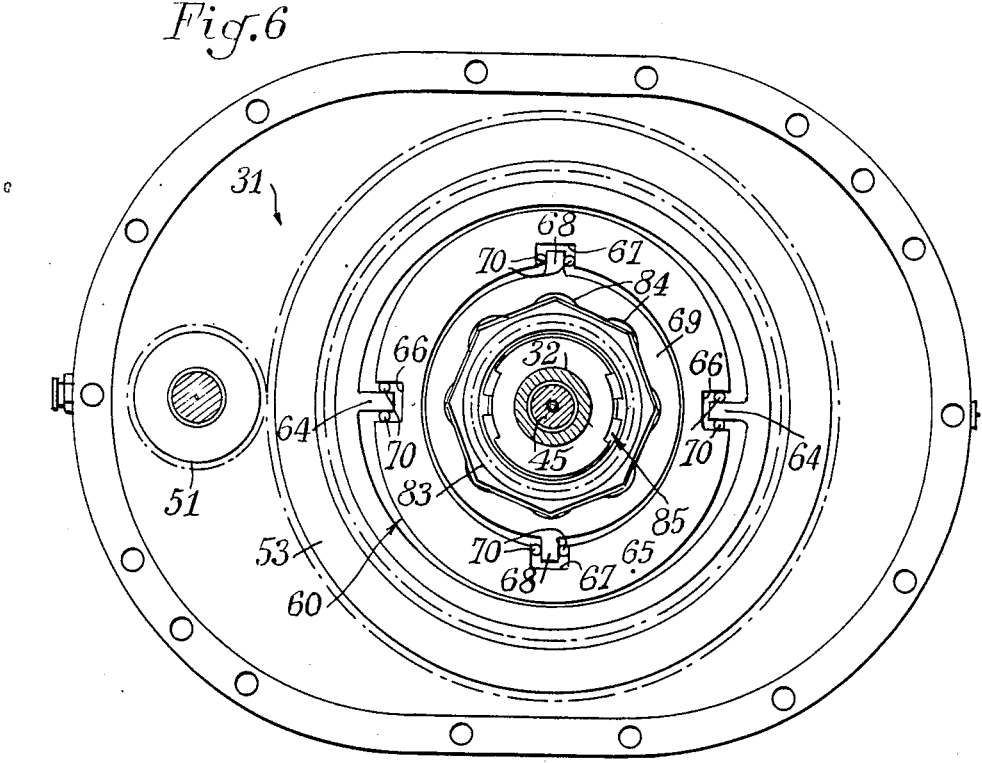
FIG. 6 is a sectional view along line VI—VI of FIG. 5.
Figure 8:
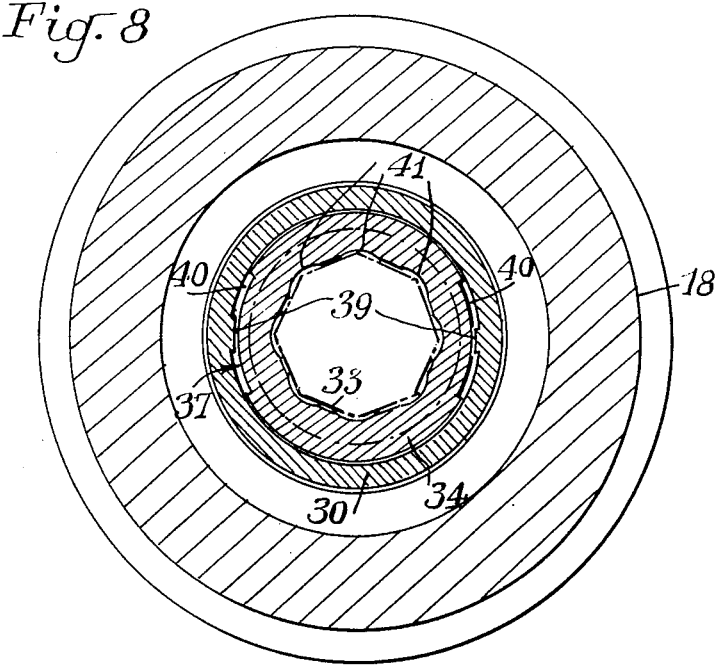
FIG. 8 is a sectional view along line VIII—VIII of FIG. 7b, in an enlarged view.

As shown in FIGS. 5 and 6, the screwing-unscrewing assembly 13 essentially comprises a mechanism for rotational drive 31 connected kinematically to the upper end of a hollow rod 32, which passes through the hollow rod 25 of the traction cylinder 17 and through the hollow traction head 18 and which is provided, at its lower end, with a male drive member 33 (FIG. 7b) with non circular section, for example a section having the shape of a regular octagon. As a variant, the male drive member 33 may be splined. Drive member 33 may be brought selectively, in a way which will be described in greater detail further on, into drive relation either with a female drive member 34 (FIG. 7b), which is situated in the hollow upper endmost region of stud-bolt 3 and which has a shape complementary to that of the male drive member 33 for rotating stud-bolt 3, or with a female drive member 35 (FIG. 7b), which also has a shape complementary to that of the male drive member 33 and which is connected to the traction head 18 in the intermediate part thereof for rotational driving thereof. So as to facilitate the engagement of the male drive member 33 in the female drive member 34 or in the female drive member 35, tapering guide recesses 41 (FIG. 8) are formed in the upper end face of the female drive member 34 and in the lower end face of the female drive member 35 at the position of each of the apexes of the octagon of these two members 34 and 35. Furthermore, the female drive members 34 and 35 are coupled respectively to a piece 30 fixed to the upper part of stud-bolt 3 and to a piece 36 fixed to the traction head 18 respectively by couplings 37 and 38 with play in the circumferential direction. More precisely, as is shown in greater detail in FIG. 8 in connection with coupling 37 (coupling 38 being similar to coupling 37), piece 30 (or piece 36) comprises two diametrically opposite teeth 39 which are engaged in two large notches 40 of the female drive member 34 (or 35), thus allowing a relative limited rotational movement between elements 30 and 34 (or 35 and 36). Thus, if the sides of the octagon of the male drive member 33 are not in concordance with the sides of the octagon of the female drive member 34 or 35 during engagement of the first in the second, by coming into contact with the conical enlargements 41 of member 34 or 35, the apexes of the octagon of the male drive member 33 will force the female drive member 34 or 35 to rotate until the sides of the octagons are in concordance, after which the male drive member 33 may be completely introduced in the female drive member 34 or 35 for rotating this latter and for rotating part 30 and the stud-bolt 3 or part 36 and the traction head 38 through teeth 39. Thus automatic positioning of the female drive member 34 or 35 is obtained with respect to the male drive member 33 when the second is engaged in the first without it being necessary to manually position these two parts so as to place the sides of their octagons in concordance with each other. When the male drive member 33 is not engaged with the female drive member 34 or 35, teeth 39 of part 30 or 36 notches 40 of part 34 or 35 are held in the position shown in FIG. 8 by return springs or by permanent magnets (not shown).

The male drive member 33 comprises longitudinal grooves 42 (FIG. 7b) which are formed in each of the sides of its octagon and which extend over practically the whole of the length of member 33 except in its lower part. A ring 43 having eight teeth which are oriented radially inwardly and which are engaged in the grooves 42 of the male drive member 33 may slide over this latter. Thus, when ring 43 is in contact with the lower face of part 35 and when the hollow rod 32 is raised or lowered, as will be described further on, ring 43 allows the traction head 18 to be raised with respect to the stud-bolt 3 or to support the weight of said head while it is lowered.

As shown in FIG. 5, the support assembly 14 comprises essentially a rotational drive mechanism 44 connected kinematically to the upper end of a rod 45 which is rotatably mounted, without possibility of axial movement, by means of two axial thrust bearings 46 and 47 (see also FIG. 7b) inside the hollow rod 32. At its lower end, rod 45 is provided with a threaded portion 48, preferably tapering, adapted to be screwed into an inner threaded portion 49 of corresponding shape, formed in part 30 below the female drive member 34. Although the threaded portion 49 and the female drive member 34 could be respectively formed and mounted directly in the upper end of stud-bolt 3, they are preferably respectively formed and mounted, as shown in FIG. 7b, in part 30 which is removably fixed, for example by screwing, to stud-bolt 3. Thus, if the threaded portion 49 or the female drive member 34 is damaged for any reason whatsoever, it is sufficient to replace part 30 whereas otherwise it would be necessary to replace the whole of stud-bolt 3.

The two rotational drive mechanisms 31 and 44 are mounted in a common casing 50 (FIGS. 1 to 5). Mechanism 31 comprises a drive pinion 51 which is fixed to the output shaft of a drive motor 52, for example a compressed air motor, and which meshes with a toothed wheel 53 which surrounds the hollow rod 32 and which is connected kinematically to this latter in a way which will be described in greater detail further on. Similarly, mechanism 44 comprises a drive pinion 54 which may be rotated by a motor 55, for example a compressed air motor, through an electromagnetic clutch 56 and which meshes with a toothed wheel 57 which surrounds the rod 45 and which is connected kinematically to the latter in a way which will be described in detail further on.

For automatic alignment of rods 32 and 45 with the axis of stud-bolt 3, the threaded portion 48 of rod 45 and a threaded portion 49 of part 30 are preferably tapering as was seen above. In addition, rod 32 has an external diameter smaller than the internal diameter of the hollow rod of piston 25 of cylinder 17 so as to provide a substantial radial clearance there between as shown in FIG. 7b. Furthermore, rod 45 is supported axially with respect to the common casing 50 by an axial thrust bearing 58 forming a spherical joint and by an axial air cushion thrust bearing 59. Finally, each of the two toothed wheels 53 and 57 is connected kinematically to the corresponding rod 32 or 45 by a drive coupling 60 or 61 having two degrees of freedom respectively in two directions perpendicular to each other and to the axis of the corresponding rod 32 or 45. Since the two drive couplings 60 and 61 are similar, only the drive coupling 60 will be described with reference to FIGS. 5 and 6. Toothed wheel 53 is in the form of a ring which is rotatably mounted in the common casing 50 by means of two ball races 62 and 63 and which comprises two drive teeth 64 which project radially inwardly in diametrically opposite positions. A second ring 65 comprising two diametrically opposite notches 66 in its external peripheral surface and two diametrically opposite notches 67 in its peripheral internal surface and staggered angularly by 90° with respect to notches 66 is mounted inside the toothed wheel 53. Notches 66 receive the teeth 64 of rings 53, whereas notches 67 receive two other drive teeth 68, diametrically opposite each other and oriented radially outwardly, of a third ring 69 which is mounted inside rings 65 and which is coupled to rod 32 (similarly, the third ring of the drive coupling 61 is coupled to rod 45). Rollers 70 are disposed on each side of each tooth 64 and 68 in the corresponding notch 66 or 67. Thus, the ring 65 may move a limited amount with respect to ring 53 in the diametrical direction defined by the two teeth 64. Similarly, ring 69 may move a limited amount with respect to ring 65 in the diametrical direction which is defined by the two notches 67 and which is perpendicular to the preceding diametrical direction. The parts are dimensioned so that each of the two rings 65 and 69 may move by about 4 mm or more in the above mentioned diametrical directions respectively with respect to ring 53 and with respect to ring 65 on each side of a position centered on the axis of ring 53. In other words, the center of ring 69 and consequently the axis of rods 32 and 45 may occupy any position inside a square with sides of about 8 mm centered on the axis of ring 53 or ring 57.

In the automatic version of the screwing-unscrewing apparatus of the present invention, a complete screwing-unscrewing assembly 13 and a complete support assembly 14 are permanently associated with each traction assembly 12. Therefore, ring 69 of the drive coupling 60 and the corresponding ring of the drive coupling 61 may be connected rigidly together by means of a permanent coupling respectively to rod 32 and to rod 45. On the other hand, in the semi-automatic version of the screwing-unscrewing apparatus of the present invention, the ring 69 of the drive coupling 60 and the corresponding ring of the drive coupling 61 are connected kinematically removably respectively to rod 32 and to rod 45 in a way which will be described further on.

Lifting means 71 are mounted between frame 11 and common casing 50 for raising and lowering rods 32 and 45 at will. As shown in FIG. 1, the lifting means 71 may be formed by two assemblies of single acting pneumatic cylinders. Each pneumatic cylinder assembly comprises three actuators 72, 73, and 74 which are connected mechanically together in series and which may be supplied with pressurised fluid independently of each other. To reduce the space occupied in the length direction by the three actuators 72, 73 and 74, they are fitted into each other, that is to say that the piston rod actuator 72 serves as cylinder for 73 and the piston rod of actuator 73 serves as cylinder for actuator 74. The piston rod of cylinder 72 has a stroke of about 300 millimeters corresponding to the screwing travel of stud-bolt 3 into the tapped hole 8 in vessel 2. The piston rod of cylinder 73 has a stroke of about 115 millimeters corresponding to the screwing travel of the traction head 8 on the tapering threaded portion 28 of stud-bolt 3. The piston rod of cylinder 74 has a stroke of about 70 millimeters corresponding to the screwing travel of rod 45 in the tapped hole 49 of part 30 which is fixed to the upper end of stud-bolt 3. The piston rods of the two cylinders 74 are fixed to the common casing 50, whereas the cylinder of the two actuators 72 are fixed respectively to two supports 75 which form an auxiliary frame which is itself supported by and fixed to frame 11. As shown in FIG. 1, each of the two supports 75 is removably fixed to a ring 76 which is itself rigidly fixed, for example by welding, to the upper part of the cylindrical ferrule 15 or 16 of frame 11, and reinforced by gussets 77.

Other lifting means 78 are fixed to the lower part of the cylindrical ferrule 15 for raising frame 11 from the upper surface of lid 1 when they are actuated in one direction, and for lowering the cylindrical ferrules 15 and 16 into contact with the upper surface of lid 1 when they are actuated in the opposite direction. The lifting means 78 may for example be formed by several electric screw actuators (a single one is shown in FIGS. 1 to 4), which are spaced evenly apart along the inner peripheral surface of the cylindrical ferrule 15.

Nut 9 of each stud-bolt 3 is provided, in its upper part, with teeth 79 with which a rotational drive mechanism 80 may be brought into engagement through an opening 81 formed in the outer cylindrical ferrule 16, as shown in FIGS. 1 to 4. The rotational drive mechanism 80, which is shown schematically in the form of a pinion adapted to be driven in rotation by a motor with two directions of rotation, may be provided in the form of a portable mechanism, which is brought manually into engagement with teeth 79 of nut 9, or it may be permanently fixed to the lower part of the outer cylindrical ferrule 16, as shown in FIGS. 1 to 4. In this latter case, a mechanism 80 is associated with the nut 9 of each stud-bolt 3.

In the semi-automatic version of the screwing-unscrewing apparatus of the present invention, the rotational drive mechanisms 31 and 44 and the drive couplings 60 and 61 associated therewith may be uncoupled from rods 32 and 45, respectively, so as to be able to be selectively and successively associated with other rods 32 and 45 associated with other traction units 12. For this purpose, rod 45 bears axially on the spherical axial thrust bearing 58 through a split washer 82 which is removably engaged in a circular groove formed in the outer cylindrical surface of rod 45 at its upper end. Furthermore, ring 69 of the drive coupling 60 and the corresponding ring of drive coupling 61 are removably connected kinematically respectively to rods 32 and 45. Since these two connections are identical, only the connection between ring 69 and rod 32 will be described. As shown in FIG. 6, ring 69 is in the form of a female drive member comprising a central passage with non circular section, for example octagonal. In the central passage of ring 69 is fitted axially a male drive member 83 which has a shape complementary to that of the central passage of ring 69 and which is connected to rod 32. Thus, when the rider 82 is removed and when the pneumatic actuators 72-74 are operated for raising the casing 50 to a level higher than the upper end of rod 45, the female drive member 69 of the drive coupling 60 and the corresonding female drive member of the drive coupling 61 are disengaged respectively from the male drive member 83 which remains attached to rod 32, and from the corresponding male drive member of the drive coupling 61, which remains attached to rod 45. So that the sides of the octagon of the male drive member 83 of the drive coupling 60 and those of the corresonding male drive member of the drive coupling 61 come automatically into concordance with the sides of the octagon of the female drive member 69 of the drive coupling 60 and with those of the corresponding female drive member of the drive coupling 61 and so as to facilitate accordingly fitting of the above mentioned male drive members into the corresponding female drive members when casing 50 is again lowered into the position shown in FIG. 5, tapered guide recesses 84 are formed in the lower surface of the female drive member 69 and in the lower surface of the corresponding female drive member of the drive coupling 61 at the position of each of the apexes of the octagon of these two female drive members. In addition, the male drive member 83 and the corresponding male drive member of the drive coupling 61 are connected respectively to rod 32 and to rod 45 through coupling 85 which has play in the circumferential direction, in an arrangement which is similar to that of coupling 37 shown in FIG. 8 and which will therefore not be described again in detail.

For axially supporting rods 32 and 45 in the absence of rider 82 and in the absence of casing 50, another rider is provided (not shown) which is similar to rider 82 and which may be engaged a circular groove formed in the outer cylindrical surface of rod 32, this other rider being adapted to bear on the upper end of the piston rod 25 of actuating cylinder 17.

Furthermore, in the semi-automatic version of the screwing-unscrewing apparatus of the present invention, so that the two rotational drive mechanisms 31 and 44 contained in casing 50, motors 52 and 53 and lifting means 71 may be brought into functional relation with rods 32 and 45 associated with another traction assembly 12, casing 50, motors 52 and 55 and the lifting means 71 are mounted in an auxiliary frame 86 moveable with respect to the main frame formed by the two cylindrical ferrules 15 and 16. As shown in FIG. 2, the auxiliary frame 86 has substantially the form of a gantry. The two legs of the gantry 86 are formed by two U shaped sections whose hollow parts face each other. At their upper end, the two U sections 87 and 88 are cross braced by means of two cross-pieces 89 (only one being visible in FIG. 2). The lower end of each of the two U sections 87 and 88 is closed by a plate 90 or 91 which is welded to the corresponding section and on which is fixed the cylinder of the actuator 72 of one of the two actuating cylinder assemblies 72-74. Under each of the two plates 90,91 are mounted two wheels 92 and 93 ( only one of which is visible in FIG. 2) which may travel over rails or tracks 94 or 95 which are fixed to the rings 76 of the ferrules 15 and 16. At least one of the wheels, for example one of the wheels 93, may be rotated by a motor-reducer assembly 96.

The operation of the screwing-unscrewing apparatus of the present invention will now be described in its automatic version during a cycle of unscrewing the stud-bolts 3 for removing lid 1 from vessel 2. It will be remembered that in the automatic version, a traction assembly 12, a complete screwing-unscrewing assembly 13 and a complete support assembly 14 are associated with each stud-bolt 3. So only the operation of the three above mentioned assemblies associated with one of the stud-bolts 3 will be described, since the three assemblies associated with each of the other stud-bolts operate simultaneously and in the same way as the three assemblies as it will now be described.

In a cycle for unscrewing stud-bolts 3, the screwing-unscrewing apparatus of the present invention is first of all brought by means of a hoist or other similar handling apparatus above lid 1, the screws of actuators 78 being in the downward extended position, then the screwing-unscrewing apparatus is lowered by means of the hoist until the lower ends of the screws of actuators 78 come into contact with lid 1. At that time, the ferrules 15 and 16 are at a distance of about 375 millimeters from the lid and the traction head 18 is above the stud-bolt 3 in alignment therewith. Then, frame 11 is lowered by means of the screw actuator 78 until ferrules 15 and 16 come into contact with the lid and, simultaneously, the piston rods of cylinders 72, 73 and 74 are completely extended. At that time, the traction head 18 which is supported by the rod 32 and ring 43 is just above the upper part of stud-bolt 3, without the threaded portion 28 of this latter and the threaded portion 27 of the traction head being in contact. Furthermore, the male drive member 33 of rod 32 is in drive relation with the female drive member 35 of the traction head 18. This latter is then rotated in a first direction by motor 52, the drive mechanism 31 and rod 32 and, simultaneously, the piston rods of cylinder 73 are progressively retracted so as to lower the traction head 18. The combined rotational and lowering movements of the traction head 18 cause screwing thereof on the threaded portion 28 of stud-bolt 3. It will be noted that, even if initially the traction head 18 were not perfectly aligned with the axis of stud-bolt 3, it is automatically aligned with the axis of said stud-bolt during the screwing operation because the two threaded portions 27 and 28 are tapering, because traction head 18 is connected to the hollow piston rod 25 by means of the bi-convex annular coupling 29 and because rod 32 is moveable transversely to a certain extent inside the axial passage of the hollow piston rod 25.

After the traction head 18 has been completely screwed onto the threaded portion 28 of stud-bolt 3 as shown in FIG. 1, the pulling cylinder 17 is actuated so as to exert on stud-bolt 3 an upwardly directed pull. While stud-bolt 3 is subjected to said pull, the drive mechanism 80 is actuated in a direction such that the nut 9 is rotated by a few turns in the unscrewing direction. Then, the pressure is released in the traction cylinder 17 so as to cause said pull to cease.

Then, the traction head 18 is rotated in the opposite direction by motor 52, the drive mechanism 31 and rod 32 and, simultaneously, the piston rods of cylinders 73 are progressively extended so as to unscrew the traction head 18 with respect to stud-bolt 3. When the piston rods of cylinders 73 are completely extended, the traction head 18 is then in the position shown in FIG. 2. At that time, frame 11 is raised by about 375 mm by means of the screw actuator 78 shown in FIG. 3. Then, the piston rods of cylinders 72 and 73 are completely retracted so as to lower rods 32 and 45 to the immediate vicinity of the upper end of stud-bolt 3. Then, rod 45 is rotated in a first direction by motor 55, the electromagnetic clutch 56 and the drive mechanism 44 and, simultaneously, the piston rods of cylinders 74 are progressively retracted so as to further lower rods 32 and 45. This lowering movement of rods 32 and 45 results, on the one hand, in engaging the male drive member 33 in the female drive member 34 (but this causes no drive effect on stud-bolt 3 since, at that time, rod 32 does not rotate) and, on the other hand, in engaging the tapering threaded portion 48 of rod 45 in the tapering threaded portion 49 of part 30. The combined rotational and lowering movements of rod 45 cause threaded portion 48 to be screwed in threaded portion 49. Here again it will be noted that, even if rods 32 and 45 are not perfectly aligned with the axis of stud-bolt 3, they are automatically aligned with the axis of said stud-bolt during this screwing operation because the threaded portions 48 and 49 are tapered and because rod 32 may move transversely to a certain extent inside the axial passage of the hollow piston rod 25, this transverse movement of rod 32 being further allowed by the axial spherical abutment 58, the axial air cushion abutment 59 and the drive couplings 60 and 61 with two degrees of freedom.

After the piston rods of cylinders 74 have been completely retracted, motor 55 is stopped and the electromagnetic clutch 56 is disengaged. Then, stud-bolt 3 is rotated in the unscrewing direction by motor 52, drive mechanism 51 and rod 32 and simultaneously the piston rods of cylinders 72 are progressively extended so as to raise the stud-bolt 3. The combined rotational and rising movements on stud-bolt 3 result in unscrewing it and releasing it from the tapped hole 8 in vessel 2. When the piston rods of cylinders 72 have been completely extended, stud-bolt 3 (as well as all the other stud-bolts) occupies a position shown in FIG. 4. At that time, the cycle for unscrewing stud-bolts 3 is finished. The screwing-unscrewing apparatus and possibly lid 1 may then be removed from vessel 2 by means of the above mentioned hoist.

For screwing stud-bolts 3 into the tapped holes 8 of vessel 2, the reverse operations to those which have just been described above are carried out. It will be simply noted that if stud-bolts 3 are used whose lower threaded portion 5 has a tapered shape, as shown in FIGS. 3 and 4, engagement of the tapered threaded portions 5 in the tapped holes 8 will be greatly facilitated.

The screwing-unscrewing apparatus of the present invention, in its semi-automatic version, operates in a way similar to that described above, except that, in this case, for example in the cycle for unscrewing stud-bolts 3, actuating cylinders 72, 73 and 74, motors 52 and 55 and casing 50 are brought successively into functional relation with each traction assembly 12 and with the rods 32 and 45 associated therewith by means of the mobile auxiliary frame 86 (FIG. 2), so as to successively screw each traction head 18 onto the threaded portion 28 of the corresponding stud-bolt 3. Once all the traction heads 18 have been screwed onto their stud-bolts 3, the pulling cylinders 17 are actuated as before so as to exert a pull on all the stud-bolts 3, then the nuts 9 are unscrewed one by one or simultaneously by means of one or more drive mechanisms 80. Then, the pressure is released simultaneously in all the cylinders 17 so as to cause said pull to cease. Then, cylinders 72, 73 and 74, motors 52 and 55 and casing 50 are brought into functional relation successively with each traction assembly 12 and with the rods 32 and 45 associated therewith so as to unscrew each traction head 18 with respect to the corresponding stud-bolt 3, then to unscrew each stud-bolt 3 with respect to the vessel 2, by operations similar to those decribed above, stud-bolt after stud-bolt.

It goes without saying that the embodiment of the present invention which has just been described above has been given by way of example, purely as indication and in no wise limiting, and that numerous modifications may be readily made by a man skilled in the art without for all that departing from the scope and spirit of the present invention.

Thus, more particularly, a safety device may be provided for venting all the traction cylinders 17 if any one of the traction heads 18 is not engaged with the corresponding stud-bolt 3 or comes loose, or if this latter is not screwed into the corresponding tapped hole 8 of vessel 2 or comes loose therefrom, while the traction cylinders 17 are actuated. To this end, each traction cylinder 17 may be equipped with a safety valve (not shown) adapted to be opened by the piston of the cylinder if this latter arrives at the end of its traction stroke, so as to vent this cylinder (and consequently all the other cylinders 17, since they are supplied in parallel).

Furthermore, the cylindrical outer ferrule 16 preferably has a thickness greater than that of the cylindrical inner ferrule 15, so that frame 11 which supports the traction cylinders 17 is deformed into a half barrel shape when said cylinders are actuated. This compensates for deformation of lid 1 which becomes convex during tightening of bolts 3 and consequently maintains the parallelism between the axis of each traction cylinder 17 and the axis of the corresponding stud-bolt 3 despite deformation of lid 1.

What is claimed is:

1. A screwing-unscrewing apparatus, in particular for screwing-unscrewing the stud-bolts for securing the lid or cover of the reactor vessel of a nuclear reactor, comprising a frame, at least one traction assembly, at least one screwing-unscrewing assembly and at least one support assembly for a stud-bolt, which are mounted on the frame, said traction assembly comprising a hydraulic cylinder having a body fixed vertically to the frame, a hollow piston rod axially movable in said body, and a hollow traction head which is connected to said hollow piston rod and which has first gripping means operative to grip an upper part of a fixing stud-bolt for exerting a vertical pull thereon when said hydraulic cylinder is actuated in one direction ; said screwing-unscrewing assembly comprising a first rotatioal drive mechanism situated above said hydraulic cylinder, and a hollow rod which passes through the hollow piston rod of said hydraulic cylinder and through said hollow traction head, is drivingly connected at its upper end to said first rotational drive mechanism and is provided at its lower end with a drive member having a non-circular cross section engageable with a complementary drive member provided at said upper part of said stud-bolt for causing rotation thereof when said first rotational drive mechanism is operated, said hollow rod of said screwing-unscrewing assembly having an outer diameter smaller than the inner diameter of the hollow piston rod of said hydraulic cylinder, so as to provide a substantial radial clearance therebetween; said support assembly comprising another rod, which is mounted for rotation, while being prevented from axial movement, inside the hollow rod of said screwing-unscrewing assembly and which has at its lower end second gripping means operative to grip said upper part of said stud-bolt for supporting it, and a second rotational drive mechanism which is adjacent to said first rotational drive mechanism of said screwingunscrewing assembly and which is drivingly connected to the upper end of said other rod; said first and second rotational drive mechanism being mounted in a casing supported on said frame; and said other rod of said support assembly being supported axially with respect to said casing by an axial thrust bearing forming a spherical joint and by an axial air cushion thrust bearing.

2. The apparatus as claimed in claim 1, wherein said support assembly further comprises lifting means mounted between said frame and said casing.

3. The apparatus as claimed in claim 2, wherein said lifting means comprise at least one set of actuating cylinders connected mechanically in series, having respective predetermined strokes and able to be supplied with pressurised fluid independently of each other.

4. The apparatus as claimed in claim 2, further comprising other lifting means which are fixed to the lower part of the frame for raising it with respect to a bearing surface.

5. The apparatus as claimed in claim 2, wherein each of said first and second rotational drive mechanisms is drivingly connected to the corresponding rod by a drive coupling having two degrees of freedom respectively in two directions perpendicular to each other and to the axis of said rod.

6. The apparatus as claimed in claim 1, wherein said hollow traction head has substantially a cylindrical shape with an internally threaded lower portion forming said first gripping means, and is connected, at its upper part, to the hollow piston rod of said hydraulic cylinder through a bi-convex annular coupling having two opposite surfaces in the form of spherical zones.

7. The apparatus as claimed in claim 6, wherein the drive member of the hollow rod of said screwing-unscrewing assembly is a male drive member, and said hollow traction head comprises, in its intermediate part, a female rotational drive member having a form complementary to that of the male drive member of the hollow rod of said screwing-unscrewing assembly.

8. The apparatus as claimed in claim 7, wherein the female drive member of said hollow traction head is drivingly coupled to said hollow traction head by a coupling having play in the circumferential direction.

9. The apparatus as claimed in claim 6, wherein said other rod of said support assembly has an externally threaded lower end portion forming said second gripping means, and the externally threaded lower end portion of said other rod and the internally threaded lower portion of said hollow traction head are tapered over at least a part of their length.

10. The apparatus as claimed in claim 5, wherein said frame comprises a main frame having two cylindrical and concentric ferrules to which are fixed several traction assemblies, which are evenly spaced apart circumferentially between said two cylindrical ferrules, and an auxiliary frame which is supported by said two ferrules and to which said lifting means are fixed.

11. The apparatus as claimed in claim 10, wherein a complete screwing-unscrewing assembly and a complete support assembly are associated with each traction assembly.

12. The apparatus as claimed in claim 10, wherein said main frame comprises two tracks, said auxiliary frame is provided with wheels for movement thereof over said tracks and the two drive couplings are removably connected kinematically to the corresponding rods so that said first and second drive mechanisms may be associated selectively and successively with other rods asociated with other traction assemblies.

13. The apparatus as claimed in claim 12, wherein each of said first and second drive couplings is connected kinematically to the corresponding rod by a female drive member with non circular section, by a male drive member which has a shape complementary to that of said female drive member and which is fitted axially into the latter, and by a coupling, which is situated between said male drive member and the corresponding rod and which has play in the circumferential direction.

14. The apparatus as claimed in claim 1, wherein said hydraulic cylinder comprises a stepped cylinder having several pistons fixed at regular intervals to the hollow piston rod and having chambers which are supplied in parallel with fluid under pressure.

15. The apparatus as claimed in claim 1, further comprising at least another rotational drive mechanism which is mounted at a lower part of the frame and which can be engaged with a nut of said stud-bolt so as to cause said nut to rotate.

* * * * *